E. H. H. SMITH.
SPOON FOR MAKING TEA, COFFEE, BOUILLON, AND OTHER DRINKS.
APPLICATION FILED DEC. 17, 1919.
1,367,568. Patented Feb. 8, 1921.
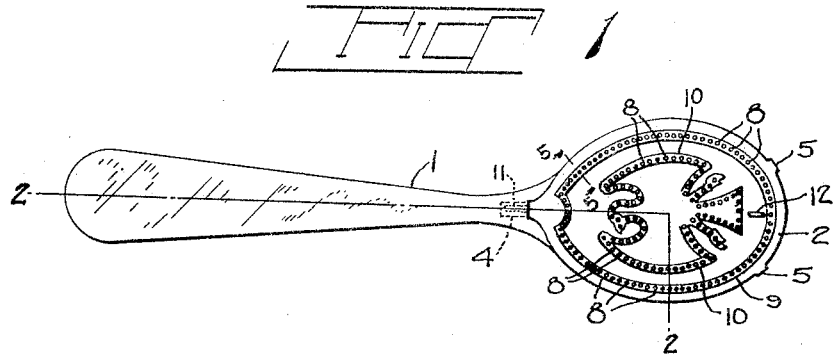
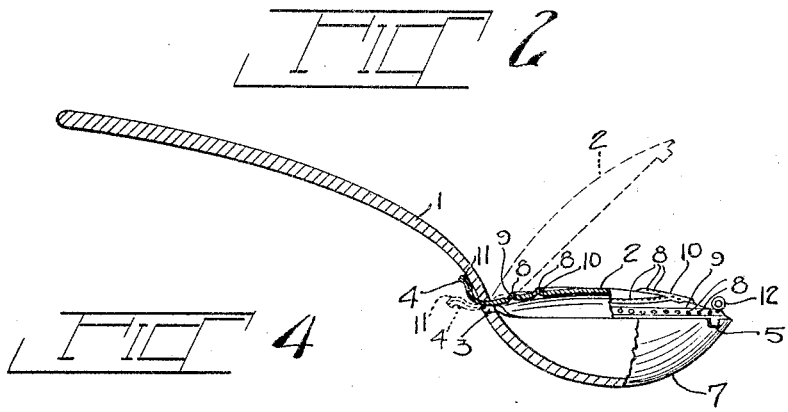
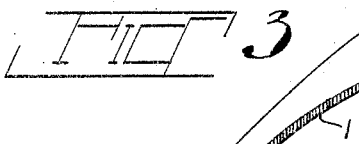
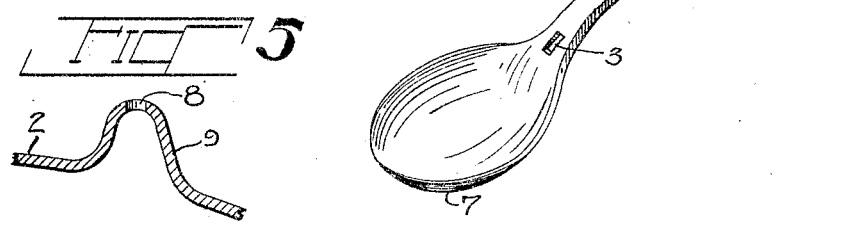
INVENTOR
Eugene H. H. Smith
BY
Alan M. Johnson
ATTORNEY

UNITED STATES PATENT OFFICE.

EUGENE H. H. SMITH, OF NEW YORK, N. Y.

SPOON FOR MAKING TEA, COFFEE, BOUILLON, AND OTHER DRINKS.

1,367,568. Specification of Letters Patent. Patented Feb. 8, 1921.

Application filed December 17, 1919. Serial No. 345,594.

*To all whom it may concern:*

Be it known that I, EUGENE H. H. SMITH, a citizen of the United States, residing in the city and State of New York, have invented a new and useful Spoon for Making Tea, Coffee, Bouillon, and other Drinks, of which the following is a specification, taken in connection with the accompanying drawings.

My invention relates to spoons and to a combined spoon, tea, coffee, bouillon or other drink brewer whereby the spoon can be used alone, or as a brewer in conjunction with a removable perforated cover. My invention further relates both to the spoon and to the cover as separate articles of manufacture.

My invention further relates to certain details of construction and combinations which will be more fully hereinafter described and pointed out in the claims.

The accompanying drawings, referred to herein and constituting a part hereof, illustrate one embodiment of the invention, and together with the description, serve to explain the principles of the invention.

Figure 1 is a plan view of my combined spoon and brewer showing the cover in position;

Fig. 2 is a vertical section substantially on the line 2—2 of Fig. 1;

Fig. 3 is a perspective view of the spoon;

Fig. 4 is a perspective view of the tea cover;

Fig. 5 is a vertical section on the line 5—5 of Fig. 1.

Prior to my invention it has been old to brew tea by putting tea leaves in a perforated or egg cone shape receptacle formed of two members permanently hinged or screwed together.

By my invention I take a spoon 1, of any approved construction, and provide it with some means which will detachably coöperate with an engaging member carried by a removable perforated cover 2. In the preferred construction I provide my spoon 1 with an opening 3 which receives and coöperates with the spring tongue 4 carried by the removable cover 2. On this cover I also provide one or more catches 5, 5, so that in manipulating my brewer the catches will not be brought into contact with the bottom of the cup, and consequently there will be no tendency to cause them to become disengaged from the bowl 7 of the spoon or to move sidewise which will hold the tea retainer and prevent escape of the contents.

My cover is provided with any suitable perforations 8, 8 which may be worked into any suitable design desired. Preferably, though not necessarily, the cover 2 is provided with strengthening corrugations 9, some of which may be worked into any design, as for example the eagle 10, the perforations being preferably, though not necessarily, in the strengthening corrugations.

By my invention the spoon 1 may be used as an ordinary tea spoon, but can be converted instantly into a brewer by simply inserting the tongue 4 into the opening 3 and clamping the cover 2 to the bowl 7 by means of one or both of the catches 5, 5. After it has performed its function of brewing the beverage, the utensil can be readily cleaned by unfastening the hooks 5, 5 and withdrawing the tongue 4 from the slot 3, permitting the spoon to be again used as an ordinary spoon. The tea cover 2 may be manufactured and sold either with or without the spoon 1. To strengthen the tongue 4, I preferably provide it with a strengthening corrugation 11.

My invention can also be applied to any spoon now on the market or in use, by simply having the handle of the spoon bored to form an opening 3 to receive the tongue 4 of my brewer, which tongue may be made flat, round or of any desired or necessary shape, and which brewer may be bought as a separate article of manufacture.

I may also, but not necessarily, place a releasing member 12 on the cover to be engaged by a fork or other device to permit the contents of the brewer to be removed without burning the fingers of the user.

Having thus described this invention in connection with an illustrative embodiment thereof, to the details of which I do not desire to be limited, what is claimed as new and what is desired to secure by Letters Patent is set forth in the appended claim.

What I claim is:—

An article of manufacture comprising an ordinary spoon having an imperforate bowl to permit the spoon to be used as an ordinary spoon, and having an opening in the handle near the imperforate bowl to detachably receive a tongue of a removable perforated brewer, and a detachable perforated brewer having a tongue to removably engage said opening in the handle and provided with catches to removably engage the sides of the bowl.

EUGENE H. H. SMITH.

Witnesses:
ALAN M. JOHNSON,
GLADYS VAN LOON.